United States Patent
Cheng et al.

(10) Patent No.: US 9,505,175 B2
(45) Date of Patent: Nov. 29, 2016

(54) THREE-DIMENSIONAL PRINTING DEVICE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Chung-Yuan Cheng, New Taipei (TW); Shih-Nan Lu, New Taipei (TW); Shih-Jer Din, New Taipei (TW); Jui-Feng Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 34 days.

(21) Appl. No.: 14/656,720

(22) Filed: Mar. 13, 2015

(65) Prior Publication Data

US 2016/0193789 A1 Jul. 7, 2016

(30) Foreign Application Priority Data

Jan. 5, 2015 (CN) .......................... 2015 1 0003082

(51) Int. Cl.
*B33Y 30/00* (2015.01)
*B29C 67/00* (2006.01)

(52) U.S. Cl.
CPC ....... *B29C 67/0088* (2013.01); *B29C 67/0055* (2013.01); *B29C 67/0085* (2013.01); *B33Y 30/00* (2014.12)

(58) Field of Classification Search
CPC ....... B33Y 10/00; B33Y 30/00; B33Y 40/00; B33Y 50/00; B33Y 50/02
See application file for complete search history.

(56) References Cited

U.S. PATENT DOCUMENTS

| 6,109,721 | A | * | 8/2000 | Kim | ....................... B41J 19/145 347/19 |
| 2007/0228592 | A1 | | 10/2007 | Dunn et al. | |
| 2012/0116568 | A1 | * | 5/2012 | Murphy | ................... B41J 3/407 700/118 |
| 2014/0117575 | A1 | | 5/2014 | Kemperle et al. | |

(Continued)

FOREIGN PATENT DOCUMENTS

CN           204054666           12/2014

OTHER PUBLICATIONS

"Office Action of Europe Counterpart Application", issued on May 23, 2016, p. 1-p. 8.

*Primary Examiner* — David Banh
(74) *Attorney, Agent, or Firm* — Jianq Chyun IP Office

(57) ABSTRACT

A three-dimensional printing device including a main body having a reference side and a support side, a plurality of driving units disposed on the main body connecting the reference side with the support side along an axis, a carrying unit including a plurality of axial connection portions, a plurality of sensing units disposed on the reference side and respectively corresponding to the axial connection portions and a control unit coupled to the driving units and the sensing units is provided. The carrying unit is assembled on the driving units and driven by the driving units to move between the reference side and the support side. Each sensing unit detects that each corresponding axial connection portion arrives at the reference side and accordingly produces a termination signal, and the control unit synchronizes operations of the driving units according to the termination signals.

8 Claims, 5 Drawing Sheets

(56) References Cited

U.S. PATENT DOCUMENTS

2015/0062231 A1* 3/2015 Danzuka .............. B41J 2/17596 347/19
2015/0137426 A1* 5/2015 Van Esbroeck ..... B29C 67/0088 264/401
2015/0165677 A1* 6/2015 Ho ...................... B29C 67/0085 425/136
2016/0082663 A1* 3/2016 Asahina .............. B29C 67/0088 425/150

* cited by examiner

THREE-DIMENSIONAL PRINTING DEVICE

CROSS-REFERENCE TO RELATED APPLICATION

This application claims the priority benefit of China application serial no. 201510003082.X, filed on Jan. 5, 2015. The entirety of the above-mentioned patent application is hereby incorporated by reference herein and made a part of this specification.

BACKGROUND

Technical Field

The technical field relates to a printing device, and more particularly, to a three-dimensional printing device.

Description of Related Art

As technology has advanced in recent years, many different methods that utilize additive manufacturing technology such as layer-by-layer model construction to build three-dimensional (3D) physical models have been proposed. Typically, the additive manufacturing technology is to convert design data of a 3D model, which is constructed by software such as computer-aided design (CAD), into multiple thin (quasi-two-dimensional) cross-sectional layers that are stacked in sequence. In the meantime, many technical means for forming multiple thin cross-sectional layers have also been proposed. For example, a printing unit of a three-dimensional printing device is configured to move above a printing bed along an X-Y plane according to spatial coordinates XYZ constructed according to the design data of the 3D model, so as to form a construction material into correct shapes of cross-sectional layers. Then, the printing unit is driven to move along the Z-axis layer-by-layer so that multiple cross-sectional layers are gradually stacked, and while the layers are cured layer-by-layer, a three-dimensional object is formed.

Generally, the printing unit is assembled on a carrying unit, and a driving unit is used for driving the carrying unit to facilitate movement of the printing unit in a printing space. Moreover, some printing units that carry materials require a plurality of driving units in order to increase load-carrying capacity. However, the driving units respectively use motors to drive the carrying unit to move between a plurality of screw rods, so that during the movement, tolerances or motor speed differences are generated due to sizes of the screw rods. Consequently, as time passes, a cumulative movement deviation is generated between the driving units, which causes imbalance and skew of the carrying unit. Therefore, it is necessary to provide a measure for correcting possible skew occurring during movement before a normal three-dimensional printing operation.

SUMMARY

The disclosure is directed to a three-dimensional printing device that secures accuracy in every three-dimensional printing through a restoration process.

The three-dimensional printing device of the disclosure includes a main body, a plurality of driving units disposed on the main body, a carrying unit, a plurality of sensing units and a control unit. The main body has a reference side and a support side. The driving units are assembled on the main body, connecting the reference side with the support side along an axis. The carrying unit is assembled on the driving units to be driven by the driving units to move between the reference side and the support side. The carrying unit includes a plurality of axial connection portions. The sensing units are disposed on the reference side and respectively corresponding to the axial connection portions. The control unit is coupled to the driving units and the sensing units. The control unit controls the driving units to drive the carrying unit to move to the reference side along the axis, wherein the sensing units respectively detect that the corresponding axial connection portions arrive at the reference side and accordingly produce a plurality of termination signals, and the control unit synchronizes operations of the driving units according to the termination signals.

Based on the above, according to exemplary embodiments of the disclosure, the sensing units are disposed on the reference side of the main body, and the carrying unit is driven to perform restoration. That is, the carrying unit is moved toward the sensing units, and whether all the sensing units are activated or turned off by arrival of the carrying unit serves as a reference for determination. That is, the control unit performs the above operation according to a calibration signal, and when the axial connection portions arrive at the reference side, the sensing units produce the termination signals so that screw rods and motors stop operating under control of the control unit. Thus, after all the termination signals have been produced, it means that a restoration process required for the three-dimensional printing device has been completed. Therefore, through the restoration process, it is ensured that the carrying unit does not skew during three-dimensional printing, and accuracy of the three-dimensional printing is improved.

To make the aforementioned and other features and advantages of the disclosure more comprehensible, several embodiments accompanied with drawings are described in detail as follows.

DESCRIPTION OF THE EMBODIMENTS

Figure 1:
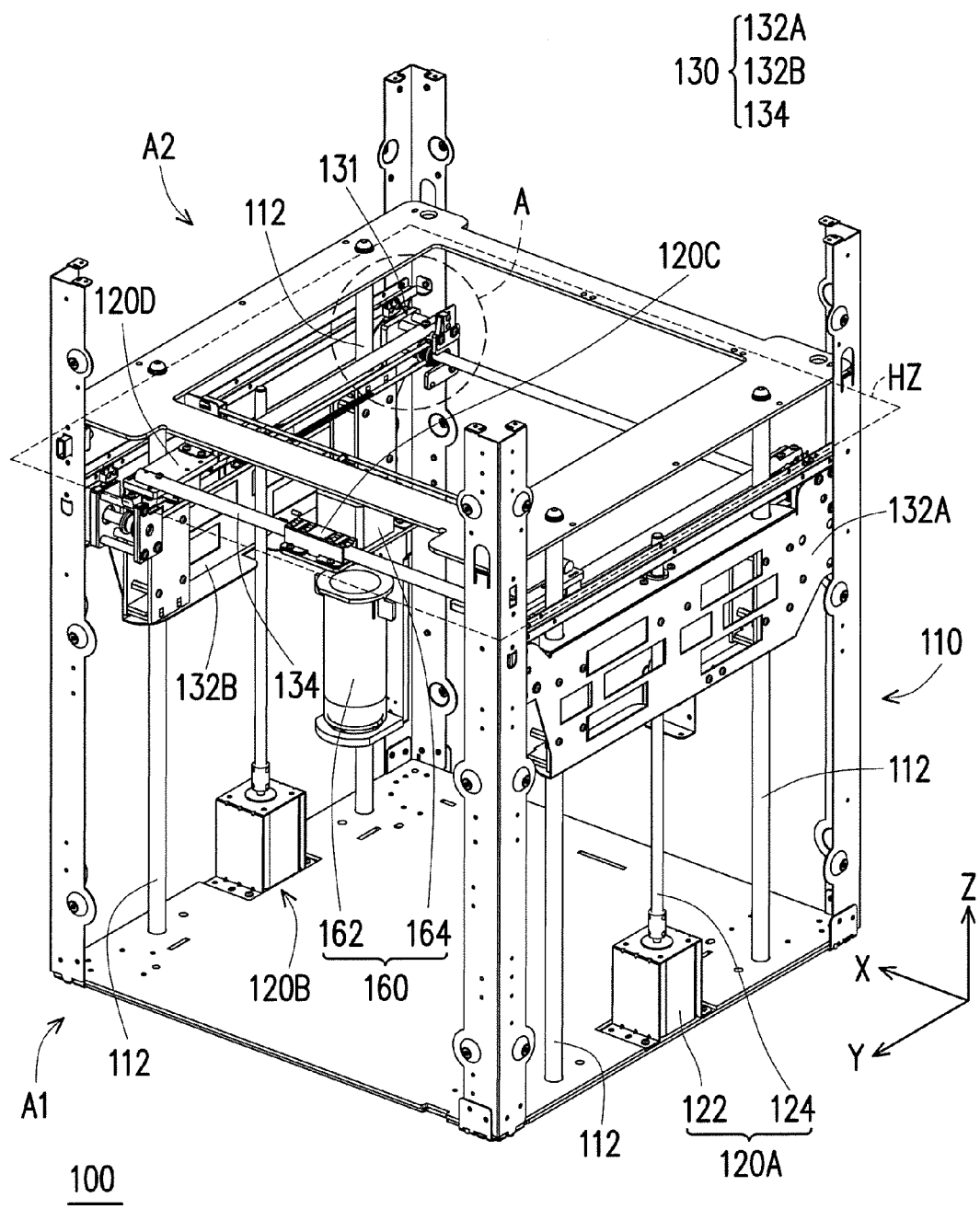
FIG. 1 is a schematic view illustrating a three-dimensional printing device according to an exemplary embodiment.
Figure 2:
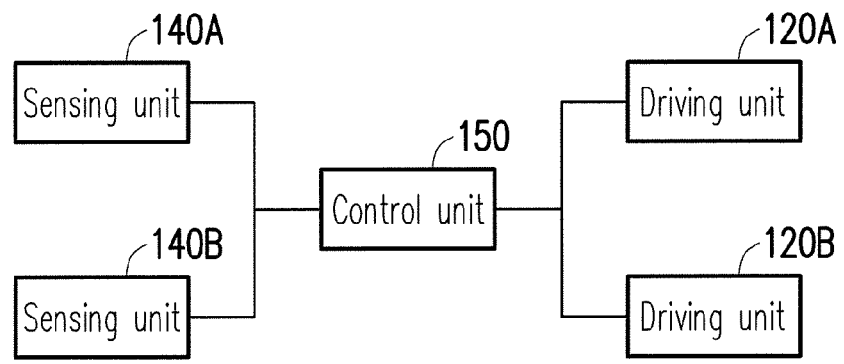
FIG. 2 illustrates an electrical connection relationship between some members of the three-dimensional printing device in FIG. 1.

FIG. 1 is a schematic view illustrating a three-dimensional printing device according to an exemplary embodiment. FIG. 2 illustrates an electrical connection relationship between some members of the three-dimensional printing device in FIG. 1. Referring to FIG. 1 and FIG. 2 together, in the present exemplary embodiment, a three-dimensional printing device 100 is adapted to perform a three-dimensional printing process for printing a three-dimensional object. The three-dimensional printing device 100 includes a main body 110, a plurality of driving units 120A and 120B, a carrying unit 130 and a control unit 150. The control unit 150 is electrically connected to the driving units 120A and 120B. A three-dimensional coordinate system is provided herein for the convenience of describing relevant members. The main body 110 is, for example, a main frame of the three-dimensional printing device 100, and is configured to carry the other members of the present exemplary embodiment. Moreover, the main body 110 has a reference side A2 and a support side A1.

The driving units 120A and 120B are respectively assembled on two opposing sides of the main body 110. The carrying unit 130 is disposed on the driving units 120A and 120B. Thus, driven by both the driving units 120A and 120B, the carrying unit 130 moves relative to the main body 110 along an axis, wherein the axis is the Z-axis in a rectangular coordinate system.

In detail, each driving unit (the driving unit 120A on one side is described herein by way of example; the same description applies to the other side and will not be repeated) includes a motor 122 and a screw rod 124, wherein the motor 122 is disposed on the support side A1 (such as the bottom plate in the drawing) of the main body 110, and the screw rod 124 is pivoted to the motor 122 and extends to the reference side A2 along the axis. That is, the carrying unit 130 is assembled between a pair of the screw rods 124, and an extension direction of the screw rod 124 is parallel to the Z-axis. Thus, the motor 122 drives the screw rod 124 to move along the Z-axis (i.e., the axis along which the carrying unit 130 moves).

The carrying unit 130 includes a pair of brackets 132A and 132B and a connection rod 134. The brackets 132A and 132B are disposed correspondingly on the driving units 120A and 120B and each have an axial connection portion 131, so as to move along the Z-axis under control of the driving units 120A and 120B. In other words, the brackets 132A and 132B of the present exemplary embodiment are correspondingly coupled to the screw rods 124. Thus, the driving units 120A and 120B use the motors 122 to drive the screw rods 124 to rotate, so as to drive the carrying unit 130 to move relative to the main body 110 along the Z-axis. In addition, the main body 110 of the present exemplary embodiment further includes a plurality of guide rods 112 extending along the Z-axis. The brackets 132A and 132B of the carrying unit 130 are respectively slidably mounted to the guide rods 112, so as to enable the brackets 132A and 132B to smoothly slide back and forth along the guide rods 112.

In addition, the connection rod 134 is connected between the brackets 132A and 132B. A three-dimensional printing unit 160 (including a cartridge 162 for containing a forming material and a driving unit 164 disposed above the cartridge 162, as shown in FIG. 1) of the three-dimensional printing device 100 is disposed on the connection rod 134 through a driving unit 120C. Accordingly, the three-dimensional printing unit 160 is driven by the driving unit 120C to move along the X-axis. In addition, the connection rod 134 is substantially disposed on the bracket 132B of the carrying unit 130 through a driving unit 120D (only the driving unit 120D on one side is illustrated; the same description applies to the other side). Thus, the connection rod 134 is driven by the driving unit 120D to move along the Y-axis. In the present exemplary embodiment, the driving units 120C, 120D and 164 are electrically connected to and controlled by the control unit 150, wherein the driving units 120C and 120D are configured to drive the three-dimensional printing unit 160 to move along an X-Y plane. Moreover, not only the structure shown in FIG. 1 but also any structure in the prior art capable of achieving the same driving effect may be applied in the present exemplary embodiment. After the three-dimensional printing unit 160 is moved to a predetermined position by the driving units 120A to 120D, the driving unit 164 squeezes the forming material out of the cartridge 162 for printing the three-dimensional object.

Figure 3:
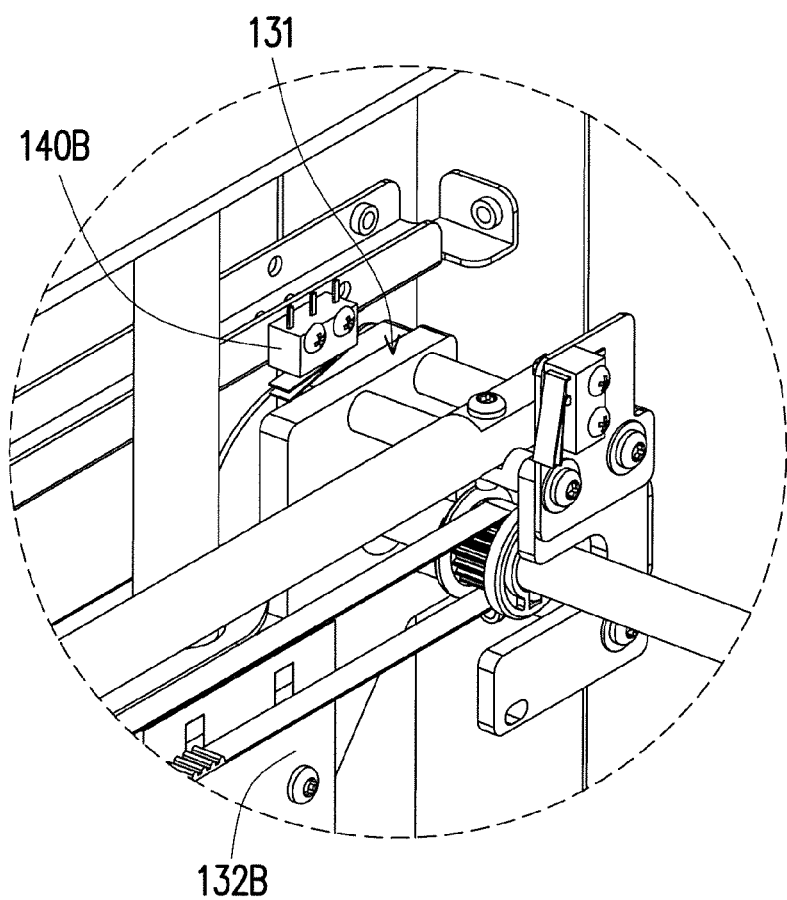
FIG. 3 is a partially enlarged view of portion A of the three-dimensional printing device in FIG. 1.

FIG. 3 is a partially enlarged view of portion A of the three-dimensional printing device in FIG. 1. Referring to FIG. 1 to FIG. 3 together, as stated above, due to difference in driving capability and manufacturing process between the driving units 120A and 120B, the driving units 120A and 120B of the present exemplary embodiment might have different movement strokes, i.e., the driving units 120A and 120B are not synchronous with each other. In other words, since the present exemplary embodiment requires a pair of the driving units 120A and 120B in order to drive the carrying unit 130 at the same time, the possibility of the aforementioned situation must be taken into careful consideration in advance and eliminated by all possible means. Accordingly, as shown in FIG. 3, the three-dimensional printing device 100 of the present exemplary embodiment further includes a pair of sensing units 140A and 140B respectively assembled on the main body 110. In the present exemplary embodiment, the sensing units 140A and 140B are both located on a horizontal reference plane HZ. In this case, the main body 110 is located on the X-Y plane, and the horizontal reference plane HZ refers to a horizontal plane above the main body 110 and parallel to the X-Y plane. The sensing units 140A and 140B correspond respectively to different portions of the carrying unit 130. However, the sensing units 140A and 140B are both located on a movement path of the carrying unit 130. In the present exemplary embodiment, similarly to the driving units 120A and 120B, the sensing units 140A and 140B are located on two opposing sides of the carrying unit 130. FIG. 1 and FIG. 3 illustrate only one of the sides for exemplary purposes. In this way, the sensing units 140A and 140B serve to sense and determine whether restoration of the carrying unit 130 on the Z-axis has been completed.

Figure 4:
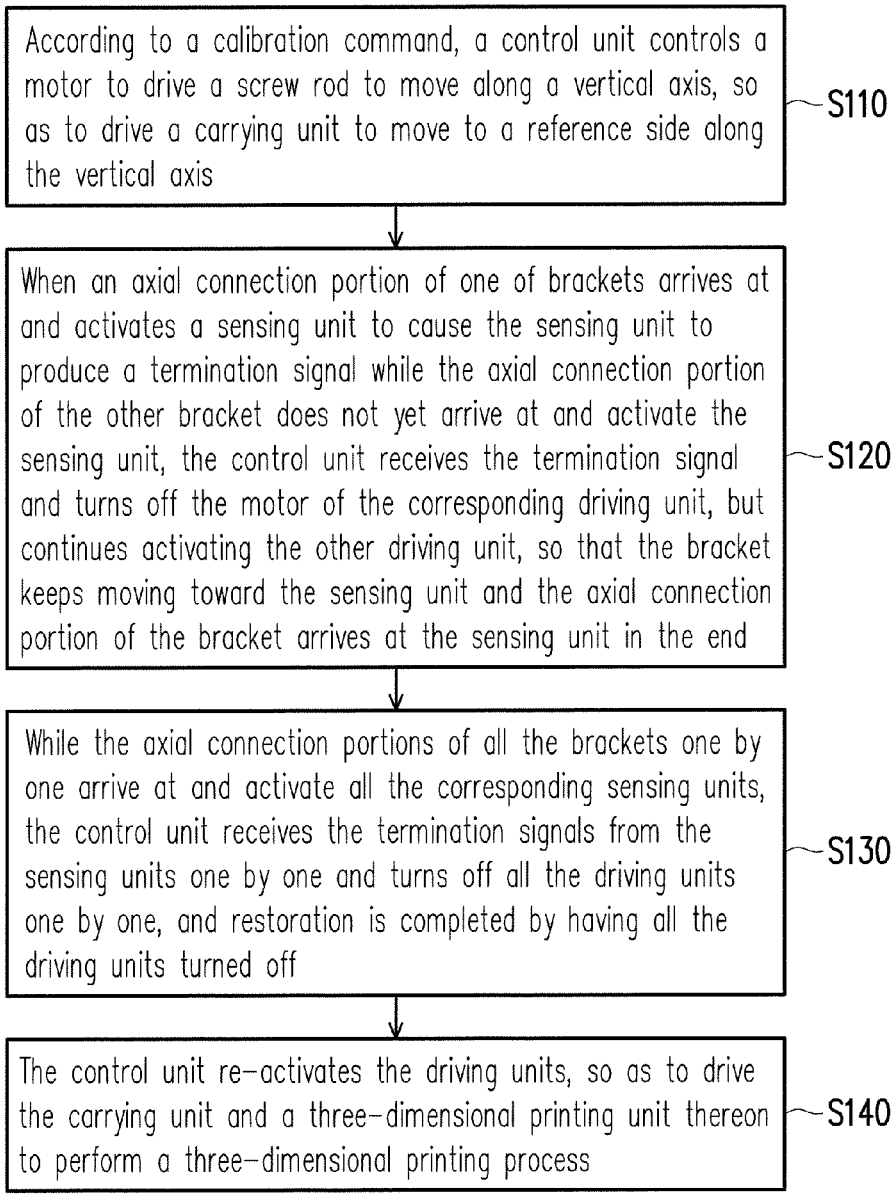
FIG. 4 illustrates restoration steps of a three-dimensional printing device according to an exemplary embodiment.
Figure 5:
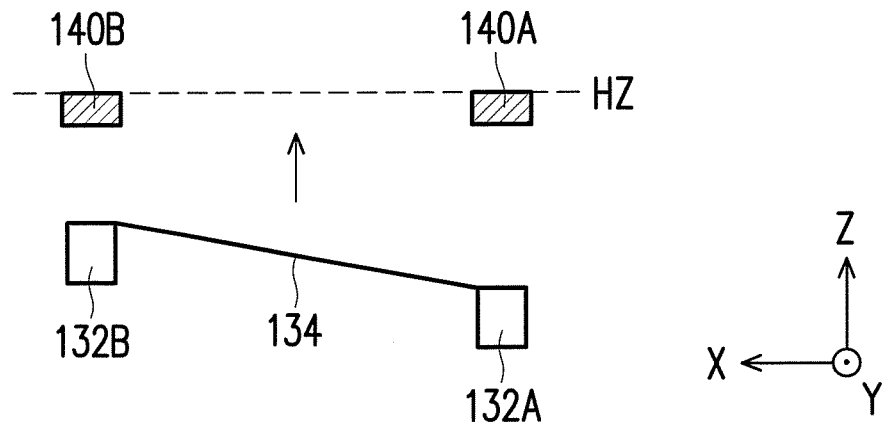
FIG. 5 to FIG. 8 illustrate a restoration process of the three-dimensional printing device.
Figure 6:
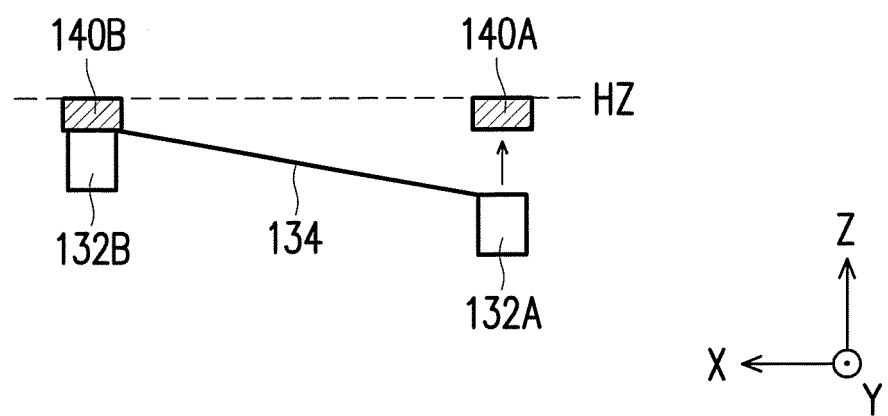
Figure 7:
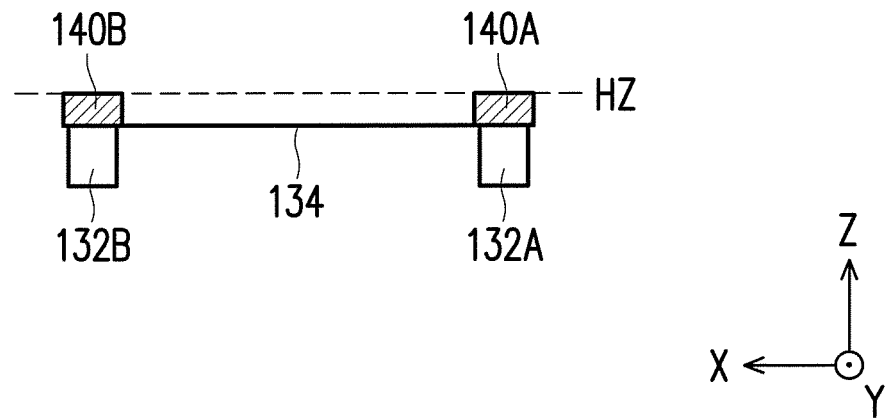

FIG. 4 illustrates restoration steps of a three-dimensional printing device according to an exemplary embodiment. FIG. 5 to FIG. 8 illustrate a restoration process of the three-dimensional printing device corresponding to the steps depicted in FIG. 4. Referring to FIG. 4 to FIG. 8 together, in the present exemplary embodiment, first, in step S110, the control unit 150 activates the driving units 120A and 120B, so that the motors 122 drives the screw rods 124 to move along the Z-axis, so as to drive the carrying unit 130 to move to the reference side A2 along the Z-axis. That is, in the present exemplary embodiment, the driving units 120A and 120B drive the carrying unit 130 to move toward the horizontal reference plane HZ. However, as stated above, due to difference between the driving units 120A and 120B in terms of manufacturing or performance and so on, the stroke in which the motor 122 of one of the driving units (e.g., 120A) drives the screw rod 124 is different from the stroke in which the motor 122 of the other driving unit (e.g., 120B) drives the screw rod 124. Therefore, as shown in FIG. 5 and FIG. 6, movement strokes of the brackets 132A and 132B of the carrying unit 130 along the Z-axis are different from each other.

As a result, the brackets 132A and 132B do not arrive at the horizontal reference plane HZ where the sensing units 140A and 140B are located at the same time. Thus, in step S120, when the axial connection portion 131 of one of the brackets (e.g., 132B) arrives at the sensing unit 140B to cause the sensing unit 140B to produce a termination signal while the axial connection portion of the other bracket 132A does not yet arrive at and activate the sensing unit 140A, the control unit 150 receives the termination signal and turns off the driving unit 120B, but continues activating the driving unit 120A. Thus, the bracket 132A keeps moving toward the sensing unit 140A so that the axial connection portion 131 of the bracket 132A arrives at the sensing unit 140A, i.e., the reference side A2 of the main body 110, in the end. In other words, in step S120, since only the bracket 132B arrives at the reference side A2, only the sensing unit 140B on that side produces the termination signal and the sensing unit (e.g., 140A) on the other side does not. Therefore, based on the termination signal of the sensing unit 140B, the control unit 150 only causes the motor 122 of the driving unit 120A corresponding to the axial connection portion 131 to stop driving, and continues the same operation as in the previous step on the other side.

Figure 8:
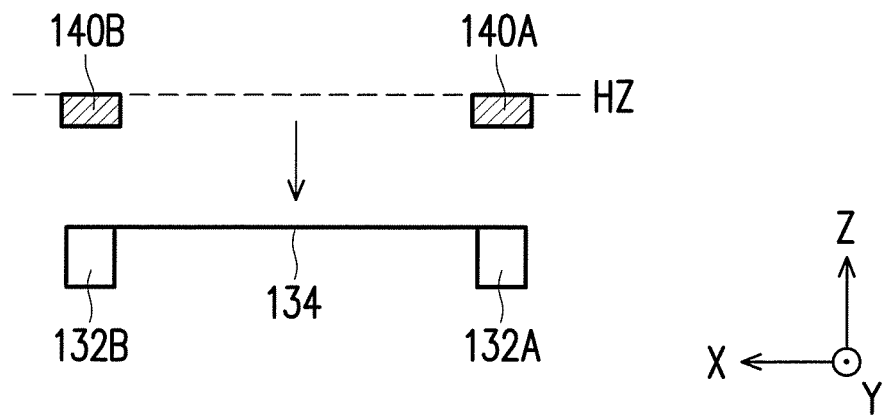

Then, in step S130, when the axial connection portions 131 of all the brackets 132A and 132B one by one arrive at and activate the corresponding sensing units 140A and 140B, it means that the whole structure of the carrying unit 130 has arrived at the reference side A2 and restoration has been completed, i.e., the carrying unit 130 of the present exemplary embodiment has attained a horizontal state. At this moment, due to receipt of the termination signals from the sensing units 140A and 140B one by one, the control unit 150 turns off all the driving units 120A and 120B one by one, thereby eliminating cumulative tolerances to synchronize operations of the driving units 120A and 120B. Finally, in step S140, the control unit 150 activates the driving units 120A and 120B to cause the same to drive the carrying unit 130 to move in a negative Z-axis direction (i.e., to move away from the reference side A2) for facilitating a three-dimensional printing process (as shown in FIG. 8) or other operations. Here, under control of the control unit 150, the driving units 120A and 120B drive the three-dimensional printing unit 160 to perform the three-dimensional printing process in a printing area of the main body 110 (e.g., on the plate structure at the bottom of the main body 110). Meanwhile, the sensing units 140A and 140B are located above the printing area. However, the disclosure is not limited thereto.

Accordingly, in the present exemplary embodiment, the horizontal reference plane HZ where the sensing units 140A and 140B are located serves as a reference for restoration of the carrying unit 130, and the horizontal reference plane HZ is also the reference side A2 of the main body 110 of the present exemplary embodiment. The sensing units 140A and 140B are located on the horizontal reference plane HZ. The control unit 150 receives a calibration signal and then drives the carrying unit 130 to move from the support side A1 toward the reference side A2. The axial connection portions 131 of the brackets 132A and 132B arrive at the sensing units 140A and 140B one by one to cause the sensing units 140A and 140B to produce terminal signals. Upon receipt of the terminal signals, the control unit 150 turns off the motors 122 of the driving units 120A and 120B. Finally, when all the axial connection portions 131 have arrived at the sensing units 140A and 140B, it means that the restoration process of the carrying unit 130 has been completed, and subsequent operations (e.g., a three-dimensional printing process, etc.) of the three-dimensional printing device 100 are thereby facilitated. The horizontal reference plane HZ herein may be any flat surface of the main body 110 parallel to the X-Y plane, and may be disposed and suitably changed according to the appearance of the three-dimensional printing device 100. In another unshown exemplary embodiment, the sensing units 140A and 140B on the reference side A2 are not located on the same horizontal plane. That is, as long as the sensing units all correspond to the carrying unit driven by a plurality of screw rods, the desired synchronization effect of the disclosure may be achieved.

In addition, in the disclosure, a calibration command may be executed not only before every three-dimensional printing, but also during the printing, so as to synchronize the operations of the driving units 120A and 120B. In the present exemplary embodiment, according to user needs, it may be previously set that the calibration command is executed after a period of time from commencement of the three-dimensional printing process, or after the three-dimensional printing process is performed a number of times. Or, the calibration command may be executed only during maintenance, depending on design techniques, user needs and environment.

In summary, in the above exemplary embodiments of the disclosure, the sensing units are disposed on the reference side of the main body, and the three-dimensional printing device drives the carrying unit to move to the horizontal reference plane. Thus, according to whether all the sensing units are activated by the carrying unit, it is determined whether the operations of the driving units are synchronized. Accordingly, a relative position of the three-dimensional printing device during the three-dimensional printing is determined in terms of the Z-axis, which effectively prevents the carrying unit from skewing, and accuracy of the three-dimensional printing is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional printing device comprising:
a main body having a reference side and a support side;
a plurality of driving units assembled on the main body, connecting the reference side with the support side along an axis;
a carrying unit assembled on the driving units to be driven by the driving units to move between the reference side and the support side, the carrying unit comprising a plurality of axial connection portions;
a plurality of sensing units disposed on the reference side, and each of the sensing units corresponding to a respective one of the axial connection portions; and
a control unit coupled to the driving units and the sensing units, the control unit controlling the driving units to drive the carrying unit to move to the reference side of the main body along the axis, wherein each sensing unit senses when its corresponding axial connection portion arrives at the reference side of the main body, and produces a termination signal indicating such the control unit utilizing the termination signal to control the driving.

2. The three-dimensional printing device according to claim 1, comprising a pair of driving units and a pair of sensing units, the pair of driving units being respectively located on two opposing sides of the carrying unit, and the pair of sensing units being respectively located on two opposing sides of the carrying unit.

3. The three-dimensional printing device according to claim 1, wherein each of the driving units comprises:
a motor disposed on the support side; and
a screw rod coupled to the motor and extending to the reference side, the carrying unit being disposed on the screw rod to be driven by the screw rod to move along the axis.

4. The three-dimensional printing device according to claim 3, wherein a stroke in which the motor of one of the driving units drives the screw rod is different from a stroke in which the motor of the other driving unit drives the screw rod.

5. The three-dimensional printing device according to claim 3, further comprising a pair of driving units, wherein the carrying unit comprises:
   a pair of brackets respectively coupled to the pair of screw rods so as to move along the axis under control of the pair of motors, the pair of brackets having the axial connection portions; and
   a connection rod connected between the pair of brackets.

6. The three-dimensional printing device according to claim 5, further comprising:
   a three-dimensional printing unit movably disposed on the connection rod and electrically connected to the control unit, the driving units under control of the control unit driving the three-dimensional printing unit to perform a three-dimensional printing process in a printing area of the main body, the sensing units being located above the printing area.

7. The three-dimensional printing device according to claim 5, wherein the main body further comprises a plurality of guide rods respectively extending along the axis, and the pair of brackets is respectively slidably disposed on the guide rods.

8. The three-dimensional printing device according to claim 1, wherein according to a calibration command, the control unit controls the driving units to drive the carrying unit to move to the reference side along the axis.

\* \* \* \* \*